Figure 5:
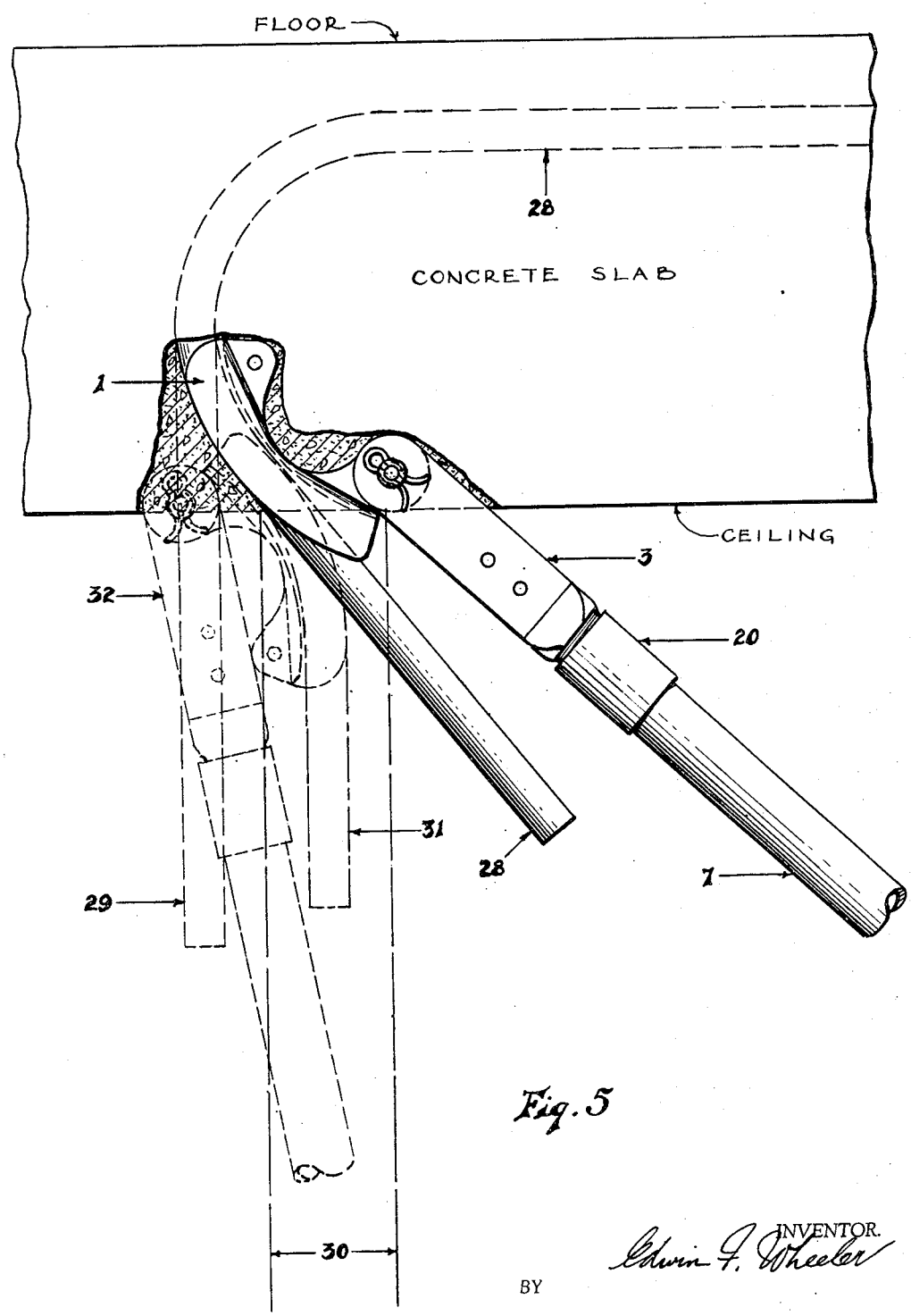

Sept. 3, 1957  E. F. WHEELER  2,804,791
ADJUSTABLE PIPE BENDING TOOL WITH SEPARABLE PARTS
Filed July 30, 1953  2 Sheets-Sheet 1
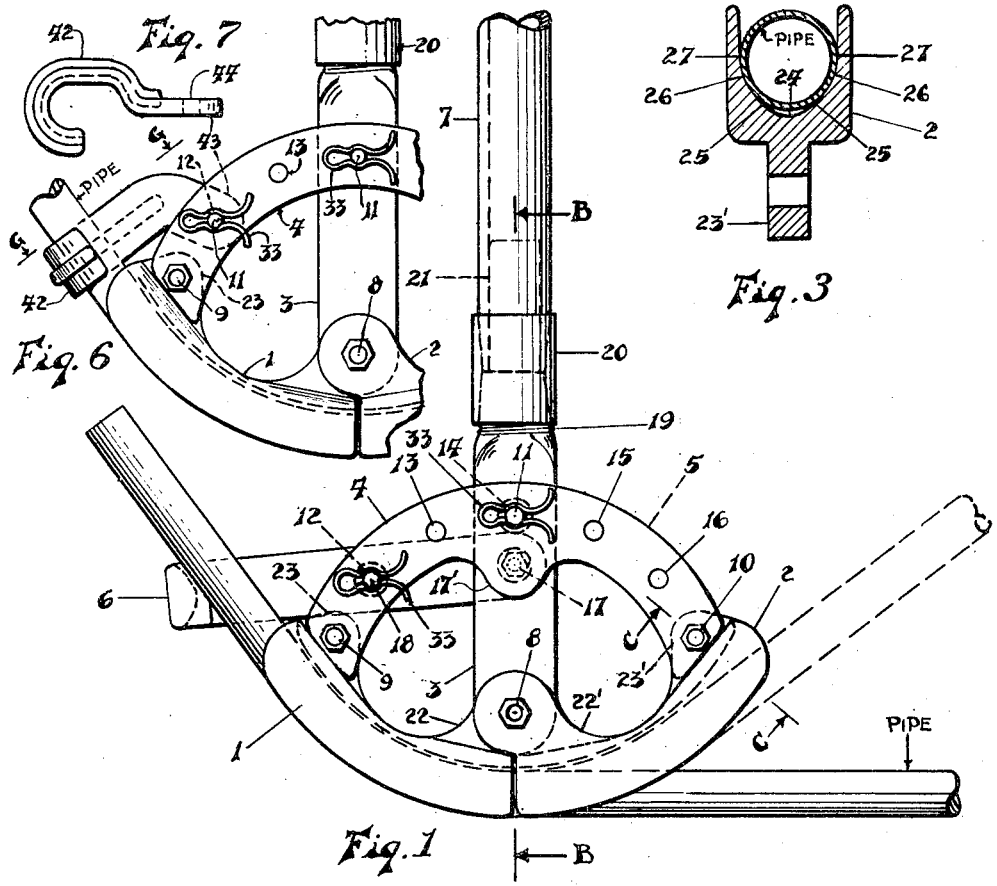
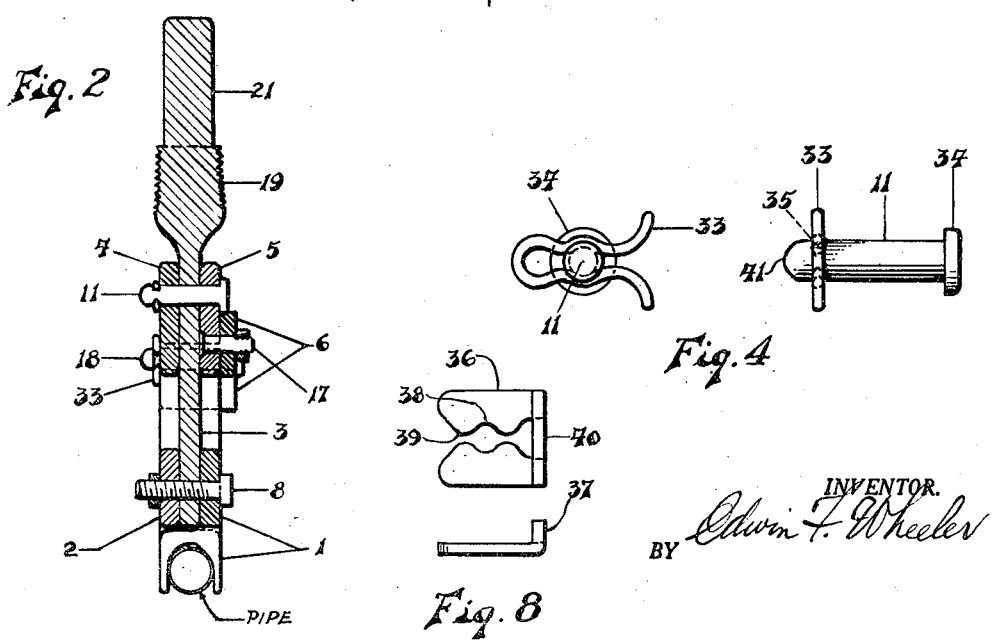
INVENTOR.
Edwin F. Wheeler
BY INVENTOR.
Edwin F. Wheeler
BY

United States Patent Office 2,804,791
Patented Sept. 3, 1957

2,804,791
ADJUSTABLE PIPE BENDING TOOL WITH SEPARABLE PARTS

Edwin F. Wheeler, Baltimore, Md.

Application July 30, 1953, Serial No. 371,276

2 Claims. (Cl. 81—15)

This invention relates to an improved pipe or conduit bending tool, and its primary purpose is to bend electrical thin-walled conduit under all practical conditions and in all positions, without injury thereto, so that insulated wires may be readily pulled into the same without impairing their insulating properties.

A principal object of the present invention is to provide a pipe or conduit bending tool, which includes adjustable means, enabling a mechanic to bend thin-walled conduit under the various practical conditions required, in order to install the complete conduit line from one outlet or location to another.

Another object of the present invention is to provide a pipe or conduit bending tool, having an adjustable handle or operating means, which can readily and quickly be adjusted to various fixed positions, to suit the conditions under which the conduit must be bent.

Another object of the present invention is to provide a pipe or conduit bending tool, having an adjustable conduit holding means to hold the conduit in place in the bender, and which can be adjusted to various fixed positions on the tool.

Another object of the present invention is to provide a pipe or conduit bending tool, which will bend thin-walled pipes or conduits at a minimum radius, and accomplish such bends without unusual skill on the part of the operator of the bending tool. This object is accomplished by use of a design of bending jaws within the tool, similar to that of the present inventor's "Pipe Bending Tool," Patent Number 2,356,716, patented August 22, 1944.

A further object of the present invention is to provide a pipe or conduit bending tool, having an adjustable handle which includes an attaching means to which a handle extension can be securely attached.

Still another object of the present invention is to provide a pipe or conduit bending tool which includes parts, which can be assembled in various combinations and used to bend pipes or conduits under unusual conditions, as hereinafter described.

Another principal object is to provide a pin and spring clip means, which is used to assemble together the various parts of the tool, and so designed as to be easily and quickly taken apart in relation to each other, in order to quickly assemble and disassemble the various parts of the tool.

Other objects of the invention will become apparent from the following description taken in connection with the accompanying drawings in which:

Figure 1 shows the pipe bending tool having its parts assembled in normal position, and the tool positioned on a piece of thin-walled conduit, during a conventional bending operation, Figure 2 shows a sectional view of the pipe bending tool, taken on line B—B of Figure 1, Figure 3 shows an enlarged sectional view through the bending jaw of the pipe bending tool, taken on line C—C of Figure 1, Figure 4 shows enlarged side and end views of the pin assembly means and its associated spring clip holding means, Figure 5 shows a practical condition of bending operation, using the present invention in disassembled form, Figure 6 is a partial view of the pipe bending tool, similar to Figure 1, except with an alternate design of pipe holder shown, Figure 7 is a side view of the alternate design of pipe holder, taken on line G—G of Figure 6, Figure 8 shows enlarged plan and front views of the preferred design of spring clip holding means.

It is the purpose of the inventor to provide, more especially for the electrical industry, a thin-walled conduit bending tool, which will be universal in its application to bend such conduit under all conditions encountered, without injury to the conduit, and with safety to the operator of the tool.

In previously invented pipe bending tools, for use to bend pipes or conduits having thin walls, the purpose of these tools is apparently limited to the bending of such conduits under ideal conditions only, that is, to create bends of 90 degrees, more or less, in standard lengths of such conduits. This purpose, therefore, limits the use of these previous tools when practically used by electricians or other mechanics, due to the fact that the conduits they install on the surfaces of walls, ceilings, or floors of buildings of various types and construction, or on machines of various types and construction, must be bent under all kinds of conditions. There are also conditions in new building construction, when thin-walled conduits are installed incorrectly within concrete floor and ceiling slabs, and after the concrete sets and becomes hard and solid, such conduits must be bent to various degrees in order to be relocated correctly within the building construction. These conditions require great skill to rebend the conduit without kinking, flattening, or other damage thereto, and previously invented bending tools cannot in any way help to accomplish these bending operations. The relocation of the conduits, therefore, invariably is accomplished with such damage to the conduit that it later becomes exceedingly difficult to pull wires therein, and in many cases such wires become damaged so as to impair their usefulness.

The above cited conditions, as well as many others, therefore, demand the use of a conduit bender which can be adjusted or easily changed in form of assembly, in order to bend the conduit under each and every condition encountered by the electrician on the job. The present invention is conceived and designed, therefore, to accomplish this purpose.

The following is a description of the present invention with references to the accompanying drawings:

The pipe bender includes two identical bending jaws 1 and 2, the handle 3, two identical supports 4 and 5, a pipe holder 6, and a handle extension pipe 7.

The jaws 1 and 2 are attached together and to the handle 3 by means of pivot lug extensions 22 and 22', respectively, and the pivot bolt 8. The supports 4 and 5 are attached to the jaws 1 and 2, by means of the lug extensions 23 and 23', respectively, and the bolts 9 and 10, respectively. The said supports, therefore, hold the bending jaws 1 and 2 in place, and are also used to attach the said handle in its various fixed positions by means of the pin 11, and the holes 12, 13, 14, 15 and 16 located coincidently in each support 4 and 5.

The pipe holder 6 is pivotally attached to the support 5 by means of the bolt 17, and may be attached in various fixed positions on the tool, by means of the pin 18, located either in holes 12 of the supports 4 and 5, as shown in Figure 1, in opposite position by using holes 16 of the supports 4 and 5, or in the center position on the tool by use of the pivot bolt 8. These three fixed positions of the pipe holder 6 are made possible by dimensioning the pivot bolt 17 a like distance or radius from either holes 12, holes 16, or pivot bolt 8. Any said fixed position of the pipe holder 6 will allow the pipe or conduit to be entered into the jaws of the tool.

The handle 3, being pivotally attached to the two jaws 1 and 2 by means of the pivot bolt 8, may be attached in fixed position on the bender in any of the five fixed positions provided by the holes 12, 13, 14, 15 and 16, inasmuch as these holes are all dimensioned of equal radius from the pivot bolt 8.

If it is desired to position the handle 3 as well as the pipe holder 6 in the same holes 12 or 16, both said parts are attached to the supports 4 and 5 by means of the pin 18, while the pin 11 is left in place in the holes 14.

It is, of course, understood that more or less fixed positions of the handle 3 may be provided on the bender, by providing more or less holes in the supports 4 and 5, but it is believed that five fixed positions are the most practical, with the normal fixed position in the center, as shown in Figure 1.

The handle 3 is provided with attaching means to extend the handle, such as standard pipe threads 19, to which is attached a piece of rigid or heavy wall standard pipe 7, by means of a standard pipe coupling 20. The handle 3 is also provided with an extension 21 extending beyond the attaching means 19, and which fits snugly inside the handle extension pipe 7, and acts as a means to prevent breakage of the pipe 7 at its weakest portion, the threads.

In reference to the bending jaws 1 and 2, they are identical in design and made with the same casting pattern, and are therefore interchangeable in position on the bender. These jaws are arcuate in shape longitudinally, having a radius equal to the minimum practical radius for the bending of the size pipe or conduit for which the bender is designed. The groove of the said jaws from end to end has a depth approximately equal to the diameter of the pipe to be bent, and is partially U-shaped and partially V-shaped in cross section from end to end.

The inventor has found by close observation and experiment through years of practical experience, that in order to bend thin-walled pipe or conduit without kinking the same, it is necessary to use a bending tool which does not impart bending pressure at the inside of the bend of the pipe, as this portion of the pipe has a natural tendency to buckle or kink. It has also been found that the pipe has a natural tendency to change from circular to oval shape while being bent.

In the design of the bending jaws of the present invention, the back of the jaws, as at 24 in Figure 3, never touch the pipe which is being bent. When the pipe enters the bending jaws, the pressure which tends to bend the pipe, is imparted by the opposite side walls of the V-shaped section of the jaws between points 25 and 26, at an angle of approximately 45 degrees towards the points 27 of the opposite side walls of the U-shaped section of the jaws, which walls prevent the natural tendency of the pipe to flatten from its normal circular cross section to an oval cross section.

The design of these bending jaws are similar to that of the bending jaws of the present inventor's "Pipe Bending Tool," Patent Number 2,356,716, patented August 22, 1944.

The purpose of the bending jaws of the present tool being designed in two parts, instead of one part of equal length to these two parts, is to accomplish unusual bending operations which cannot be made with a single bending jaw, as included in previously invented pipe bending tools. A practical example of such a bending operation would be a condition in building construction as shown in Figure 5, and as hereinafter described.

The primary purpose of the pipe or conduit bending tool, herein described, to bend pipe or conduit under all conditions, is accomplished by the adjustability of its handle 3 to various fixed positions, thereby changing the angle of the handle in relation to the bending jaws, and is further accomplished by the adjustability of the pipe holder 6 to various fixed positions in relation to both the bending jaws and the handle position. This dual adjustability allows the tool to bend pipes or conduits extending from any plane, from the horizontal to the vertical, whether the same are out in the open or positioned in corners where they are not easily accessible.

In reference to the installation of electrical thin-walled conduits, which are eventually concealed within floors, ceilings, partitions and walls of buildings, such conduits must be bent at various angles in order to create continuous raceways from one electrical outlet to another. These conduit raceways are usually installed in two stages: the first stage constituting the "roughing in" installation, in which the conduit of the raceway is installed in the concrete slab forming the ceiling of the story below, and the floor of the story above. Some of these conduit raceways must terminate in outlets in partitions or walls directly above or below the concrete slab, or must pass completely through these partitions or walls to other concrete slabs forming other ceilings or floors of the building. The second, constituting the "nippling out" stage, is the installation of the conduit within the areas later to be occupied by the partitions or walls.

Most of the bending operations necessary for the "roughing in" stage can be done with previously invented bending tools, as the conditions under which the bending is done are not difficult. However, in the "nippling out" stage, many conditions are encountered which requires bending operations which are impossible to accomplish with previously invented bending tools, without injury to the conduit. This is chiefly due to the single fixed positions of the handle and pipe holder of these conventional tools. The adjustable features of the present invention are ideally suited to meet the requirements of the "nippling out" stage of conduit bending, and also accomplish the bending operations of the "roughing in" stage much more easily and efficiently.

Figure 5 shows a section of a concrete ceiling in which is encased a conduit 28, whose protruding end had been "roughed in" incorrectly, thereby extending it down in the position shown by short dash lines 29. The correct position of the partition to be later built is shown within the area represented by the long dash lines 30. As the conduit 28 must be completely concealed within the partition 30, it must be bent into position as shown by dot and dash lines 31.

To accomplish this particular bending operation, the tool is disassembled, and only one bending jaw 1, and the handle 3 with its handle extension 7, are used. After the concrete has been cut away around the conduit 28, the jaw 1 is inserted around the said conduit, as shown in Figure 5. The mechanic holds the tool in place by grasping the handle extension 7 with one hand, and with the other hand he bends the conduit over the bending jaw 1 as a guide. Figure 5 shows the position of the parts of the tool and the conduit 28, after the first part of this bending operation, as described directly above. The tool is then shifted into position as shown by dash lines 32, and the conduit 28 is then bent over the jaw 1 into position as shown by the dot and dash lines 31. After the above described bending operation is accomplished, the conduit 28 is finally positioned correctly within the area to be later occupied by the partition 30, and the bending is done without any resulting injury to the conduit.

The above described bending operation can be, of course, applied to a conduit extending up from a concrete floor, or extending out from a concrete or masonry wall. Other types of bends can also be made in the conduit under these conditions.

In order to accomplish the quick adjustment of the handle 3 and the pipe holder 6, an attaching means is provided in the design of the pins 11 and 18, and their associated spring clips 33. Figure 4 shows enlarged views of the pin 11, which is typical also of the design of the longer pin 18, and also shows the spring clip 33 attached thereto. These pins have a flat head 34 on one end, and a circular groove 35 at the opposite end.

The spring clip 33 is made of spring steel wire of comparatively heavy gauge or diameter, which fits snugly into the groove 35, in normal position as shown. The depth of the said groove is equal approximately to the diameter of the wire of the spring clip 33, so that the said clip is firmly held in place in the said groove and cannot be unintentionally removed. The spring clip 33 is formed similar to a conventional cotter pin, except that the head is formed of large enough diameter to allow the two opposite ends of spring apart far enough to permit the clip to be slid into the groove 35, in a direction toward the clip head, without distorting or straining the clip material to cause the clip to lose its natural spring tension. Also, the center of the clip is shaped in circular form to fit the groove 35, in such manner that this center portion becomes the normal position of the clip in the groove 35 of the pin, due to the spring tension of the clip material. The two ends of the spring clip 33 are shaped in semi-circular form and curve away from each other in such manner to allow the said clip to be slid into or out of the groove 35. The manner in which these ends are bent may take other forms, such that they can be sprung apart by use of a screwdriver or pair of pliers, or may be of substantially the same form as shown except that the ends may be long enough to be sprung apart by use of the fingers of the mechanic.

This attaching means, as described above, therefore, furnishes a quick and easy method of shifting the handle 3 and pipe holder 6 to various positions on the tool, to suit the various bending conditions encountered. Of course, bolts could be used in place of this attaching pin means, but they could not be removed or inserted in place as quickly, or stay as firmly in place with as much dependability. Cotter pins could also be used in place of the spring clips 33, by omitting the groove 35 in the pins, and drilling cotter pin holes in their place, but this pin holding means would not be as efficient as the spring clip means described as part of this tool.

The bolts 8, 9 and 10, and the pins 11 and 18 are made of steel and case hardened in order to withstand the hard service required of these parts. The threads of the pivot bolt 8 extend practically the entire length of the bolt in order to permit tight assembly of the associated parts of the tool under the various assembly arrangements possible with this tool.

Of course, bolts 8, 9 and 10 may be replaced with pins 11 and spring clips 33, in order to further the purpose of the quick and easy method of dis-assembling and re-assembling the various parts of the tool.

In reference to Figure 8, another form of spring clip 36 is shown. This spring clip is made of flat spring steel, and can be made as a stamping by cutting and forming the same with machine operated dies. This form of spring clip could therefore be made with less cost then the form shown and described as spring clip 33. Spring clip 36 would also be much stronger than spring clip 33, and could stand considerably more abuse without damage. The design and shape shown for spring clip 36 will produce a spring clip which will stay firmly in place in the groove 35 of pin 11 or 18, yet can be quickly removed from the said groove without distorting or straining the clip material. This is accomplished by designing the clip with two identically shaped halves located opposite to each other and held in normal position by the bent back portion 37, enabling the center semi-circular portions 38 of each half to fit snugly into the pin groove 35, and the end portions 39 shaped partially concave and sloping away at angles opposite to each other, to permit the clip 36 to be easily and quickly inserted in the groove 35 of pins 11 or 18. The portion 37 is bent at right angles to the halves which form the main body of the clip, for two reasons. First, because the connecting part 40 of portion 37 permits the spring steel material to bend at right angles to the thickness of the material, which in turn allows the two halves of the clip to spread apart sufficiently to be inserted into, or consequently removed from, the pin groove 35 without distortion, so that the normal desired position of the two halves in relation to each other can be maintained, in order to provide a snug fit of the center portions 38 around the pin groove 35. Second, because the bent portion 37 provides a means to remove clip 36 from the groove of pin 11 or 18, either by gripping the portion 37 with the jaws of a pair of pliers, or by inserting the flat end of a screwdriver between the portion 37 and the end 41 of the pin 11 or 18 in such manner as to force the clip 36 out of the pin groove 35.

In reference to Figure 6, an alternate design of pipe holder 42 is shown, which can be used instead of the previously described pipe holder 6. This pipe holder 42 is designed to have its portion 43 inserted between the supports 4 and 5, and held in place by means of the hole 44 and another pin 11 which can either be placed in holes 12 of supports 4 and 5 as shown, or in holes 16. If the pipe holder 42 is used, suports 4 and 5 can be made, as shown, without the pivot extension 17', and the pivot bolt 17 is omitted.

Although the previous description of Figure 5 covers only one possible practical condition wherein this invention performs unusual bending operations impossible to accomplish with previously invented thin-walled conduit benders, it can readily be seen that the tool of this invention can perform similar bending operations necessary under many other conditions which are encountered by electricians while installing thin-walled conduit in old and new building construction.

It is to be understood that the general contour and design of this bending tool may be varied within wide limits, without departing from the spirit of the invention, and the scope of the appended claims.

I claim the following:

1. In a pipe bending tool having a bending jaw formed longitudinally arcuate and of like radius to the pipe to be bent, said bending jaw consisting of two identically formed separable elongated arcuate sections joined end to end to form an arcuate jaw twice the length of a section, each arcuate section having radially inwardly projecting lug extensions at each end thereof, the lug extensions at the inner, or joined, ends of said arcuate sections being overlapped, an adjustable handle pivotally joined at its end to said overlapping lug extensions, spaced semi-circular supports separably joined at their ends to the lug extensions at the outer ends of said arcuate sections, said handle extending between said spaced supports, means for separably securing an intermediate portion of said handle to said semi-circular supports at a plurality of circumferentially spaced portions, and an adjustable pipe holder adapted to be separably attached in various positions between the said spaced supports to hold the pipe in various positions within the said bending jaw.

2. In a pipe bending tool having a bending jaw formed longitudinally arcuate and of like radius to the pipe to be bent, said bending jaw consisting of two identically formed separable elongated arcuate sections joined end to end to form an arcuate jaw twice the length of a section, each arcuate section having radially inwardly projecting lug extensions at each end thereof, the lug extensions at the inner, or joined, ends of said arcuate sections being overlapped about coinciding pivot holes placed therein, an adjustable handle pivotally joined at its end to the said coinciding pivot holes between the said overlapping lug extensions, spaced semi-circular supports separably joined at their ends to fastening holes in the lug extensions at the outer ends of said arcuate sections, said semi-circular supports having a plurality of circumferentially spaced fastening holes located on an arc of a circle centered at said pivot hole and of a radius equal to the distance between said pivot hole and the fastening hole at the outer end of one of the arcuate sections, said handle having a pivot hole at its end and a fastening hole placed in an intermediate portion thereof, said handle extending between said spaced supports, fastening means for separably securing the fastening hole of said handle to like spaced fastening holes of said supports, and an adjustable pipe holder adapted to be separably attached in various positions between the said spaced supports at their circumferentially spaced fastening holes to hold the pipe in various positions within the said bending jaw.

References Cited in the file of this patent

UNITED STATES PATENTS

| | | |
|---|---|---|
| 682,671 | Condon | Sept. 17, 1901 |
| 806,085 | Green et al. | Nov. 28, 1905 |
| 895,842 | Chambers | Aug. 11, 1908 |
| 907,210 | Williams | Dec. 22, 1908 |
| 1,075,837 | Malo et al. | Oct. 14, 1913 |
| 1,247,729 | Scribner | Nov. 27, 1917 |
| 1,907,506 | Coburn | May 9, 1933 |
| 2,127,185 | Parker | Aug. 16, 1938 |
| 2,349,525 | St. Clair | May 23, 1944 |
| 2,356,716 | Wheeler | Aug. 22, 1944 |
| 2,492,491 | McCalla | Dec. 27, 1949 |
| 2,646,713 | Summerbell | July 28, 1953 |